US008602138B2

(12) United States Patent
Filkoski et al.

(10) Patent No.: US 8,602,138 B2
(45) Date of Patent: Dec. 10, 2013

(54) MOTORIZED ANTI-TIPPER DEVICE

(76) Inventors: Paul Filkoski, Montross, VA (US); Alan Warren, Colonial Beach, VA (US)

( * ) Notice: Subject to any disclaimer, the term of this patent is extended or adjusted under 35 U.S.C. 154(b) by 184 days.

(21) Appl. No.: 13/035,324

(22) Filed: Feb. 25, 2011

(65) Prior Publication Data

US 2011/0214929 A1  Sep. 8, 2011

Related U.S. Application Data

(60) Provisional application No. 61/308,083, filed on Feb. 25, 2010.

(51) Int. Cl.
*B60K 1/00* (2006.01)
(52) U.S. Cl.
USPC ........ 180/65.1; 180/907; 280/250; 280/304.1
(58) Field of Classification Search
USPC ............. 180/65.1, 11, 907, 15, 12, 210, 515, 180/65.6, 65.31; 280/250.1, 304.1
See application file for complete search history.

(56) References Cited

U.S. PATENT DOCUMENTS

| 2,495,573 | A | * | 1/1950 | Duke | 180/11 |
| 2,798,565 | A | * | 7/1957 | Rosenthal et al. | 180/65.1 |
| 3,901,337 | A | * | 8/1975 | Cragg | 180/907 |
| 4,119,163 | A | * | 10/1978 | Ball | 180/907 |
| 4,805,712 | A | * | 2/1989 | Singleton | 180/65.1 |
| 5,022,476 | A | * | 6/1991 | Weege | 180/907 |
| 5,161,630 | A | * | 11/1992 | Garin et al. | 180/65.31 |
| 5,291,959 | A | * | 3/1994 | Malblanc | 180/11 |
| 5,351,774 | A | * | 10/1994 | Okamoto | 180/65.1 |
| 5,542,690 | A | * | 8/1996 | Kozicki | 280/304.1 |
| 5,771,988 | A | * | 6/1998 | Kikutani et al. | 180/65.51 |
| 6,360,836 | B1 | * | 3/2002 | Milano et al. | 180/65.6 |
| 6,481,514 | B2 | * | 11/2002 | Takada | 180/11 |
| 6,860,347 | B2 | * | 3/2005 | Sinclair et al. | 180/11 |
| 7,341,123 | B2 | * | 3/2008 | Brendel et al. | 180/65.51 |
| 7,597,163 | B2 | * | 10/2009 | Goertzen et al. | 180/65.1 |
| 7,823,674 | B2 | * | 11/2010 | Bowles et al. | 180/210 |
| 7,886,854 | B2 | * | 2/2011 | Chiu | 180/65.1 |
| 8,146,704 | B2 | * | 4/2012 | Ruhter et al. | 180/326 |
| 8,172,016 | B2 | * | 5/2012 | Goertzen et al. | 180/65.1 |
| 8,261,867 | B1 | * | 9/2012 | Gainer | 180/65.6 |
| 2003/0159862 | A1 | * | 8/2003 | Wu | 180/65.1 |
| 2007/0235234 | A1 | * | 10/2007 | De Kruijf | 180/65.2 |

* cited by examiner

*Primary Examiner* — Hau Phan

(74) *Attorney, Agent, or Firm* — Bernard G. Pike; Pike IP Law, PLLC

(57) ABSTRACT

A wheelchair attachment for powering a wheelchair is described. An attachment for a conventional wheelchair converts a non-motorized wheelchair into a motorized wheelchair. The attachment may also act as an anti-tipping device.

11 Claims, 5 Drawing Sheets

MOTORIZED ANTI-TIPPER DEVICE

This patent applications claims priority under 35 U.S.C. §119 to U.S. Provisional Patent Application Ser. No. 61/308,083 filed on Feb. 25, 2010 which is incorporated by reference in its entirety.

FIELD OF THE INVENTION

The present invention is directed to wheelchair accessories. In specific embodiments, the invention is directed to an attachment for a conventional wheelchair for converting a non-motorized wheelchair into a motorized wheelchair.

BACKGROUND

Conventional non-motorized wheelchairs are typically powered by someone pushing the wheelchair to assist the user or by the user using their hands to directly turn the wheels of the wheelchair. Both methods have their limitations. In the first case, the user of the wheelchair is dependent on another person for their mobility. While in the latter case, the user is limited by their physical condition which may limit their ability to do everything that they would like to do.

Motorized wheelchairs have been developed to assist people confined to wheelchairs increase their independence. Motorized wheelchairs, typically, include electrically powered motors that may be controlled by the user to move the wheelchair. However, motorized wheelchairs are heavy and expensive. Users of a wheelchair may want to regularly move the wheelchair by themselves in most cases. For example, a user of a wheelchair may want to use a non-motorized wheelchair in or around their home. This allows the user to get some exercise and maintain their health, strength, confidence, and independence. However, a user may wish to use a motorized wheelchair when going out for extended periods, for example, the user may wish to use a powered wheelchair when going out with others, shopping, or to parks. A motorized wheelchair may allow faster movement and less fatigue for the user. At times, a person confined to a wheelchair may wish to use a motorized wheelchair and, at other time, a user may wish to use a non-motorized wheelchair.

Further, nursing homes or hospitals may not wish to invest in many motorized wheelchairs, but may wish to purchase conventional non-motorized wheelchairs and a number of attachments that may convert the conventional non-motorized wheelchairs to motorized wheelchairs.

Additionally, any wheelchair has a tendency to tip backwards when climbing an incline. A motorized wheelchair may additionally have a tendency to tip backwards if started too fast or accelerating too quickly. This may be an increased risk if the batteries have just been charged and the user not accustomed to the fully charged battery and the speed of the wheelchair with a full charge.

Therefore, there is a need for an attachment for a wheelchair that allows conversion of a non-motorized wheelchair into a motorized wheelchair. There is a further need for an attachment that allows a wheelchair to be reversibly converted from a non-motorized wheelchair into a motorized wheelchair.

There is also a need for an attachment for a wheelchair that allows for permanent or reversible conversion of a non-motorized wheelchair into a motorized wheelchair that also acts as an anti-tipping device.

SUMMARY

Embodiments of the attachment for a wheelchair meet some or all of these needs. For example, embodiments of the attachment for a wheelchair provide all or some of the following features:

An embodiment of the attachment for a wheelchair may comprise a two component system (left and right) that installs easily onto the back of the wheelchair. Such an embodiment may comprise two components wherein each component comprises a motors and a battery, thereby turning the wheelchair into a mobile power chair. See FIGS. 5-7, for example.

The control device may be a simple joystick control attached to the arm of the wheelchair that is capable of independently controlling any motor attached to the wheelchair such that the wheelchair may be maneuvered in any directions.

In another embodiment, the attachment for a wheelchair may comprise only one portion either the left side or the right side, a person who only needed supplemental power to the left or right side of the wheelchair could purchase this embodiment. This embodiment may be beneficial for someone with a temporary disability to either left or right side, reducing the cost of powering a wheelchair and allowing the person to continue to exercise the healthy arm.

The ease of installation of this device and the adaptability to any wheelchair makes this a more affordable option to any other power mobility device on the market.

Embodiments of the invention may include a quick disconnect feature for easy addition or removal of the attachment to the wheelchair and to ease transport of the wheelchair.

This ease of connection and disconnection to any wheelchair or transport chair enables this motorized anti-tipper device to be utilized among a variety of chairs in a rehabilitation facility or from one home to another.

Embodiments of the attachment for the wheelchair may also be used as a pushrim activated power assist device for a manual wheelchair to assist the mobility and independence of a wheelchair user. A pushrim power assist device may comprise a lower horsepower motor than a fully motorized wheelchair.

DESCRIPTION OF EMBODIMENTS

Embodiments of the attachment for a wheelchair comprise a left wheel attached to a left wheel motor, a right wheel attached to a right wheel motor, and a controller capable of independently controlling the left wheel motor and the right motor.

Figure 1:
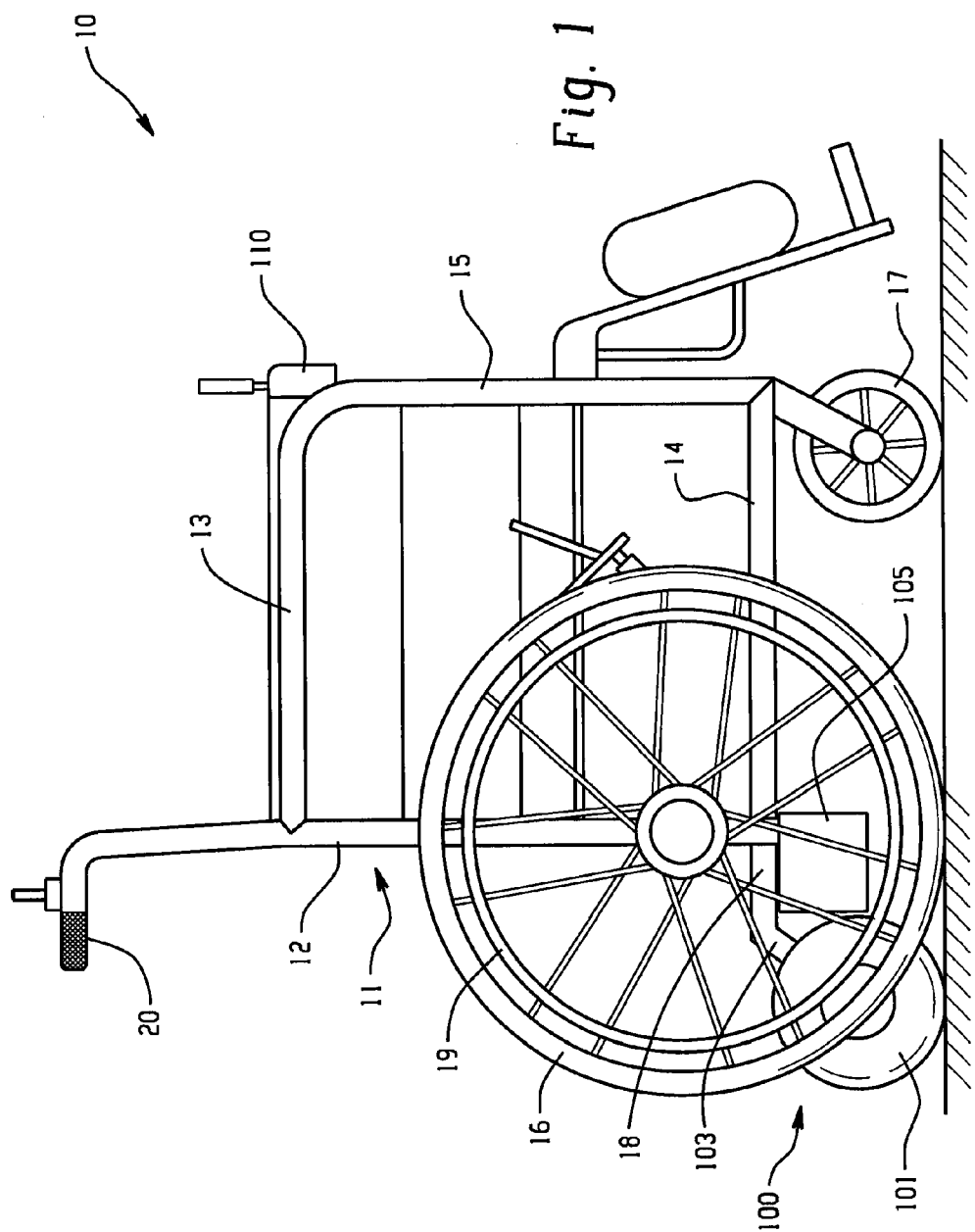
FIG. 1 depicts an embodiment of a motorized anti-tipper device attached to a wheelchair.

An embodiment of the attachment for a wheelchair connected to a wheelchair is shown in FIG. 1. A typical conventional wheelchair 10 comprises a frame 11. The frame 11 has laterally spaced horizontal seat rails. The frame 11 has laterally spaced generally vertical back rails 12. The frame 11 also comprises laterally spaced horizontal arm rails 13. The arm rails 13 are provided forward of the back rails 12 above the seat rails. The frame 11 also has laterally spaced horizontal leg rails 14. The leg rails 14 are provided forward of the back rails 12 below the seat rails. The frame 11 also has laterally spaced vertical front rails 15. The front rails 15 are coupled to the arm rails 12 and the seat rails and leg rails 14. The frame of a conventional wheelchair may also comprise kick tubes 18. The kick tubes 18 are typically in a tubular shape. Kick tubes may be in any diameter tubing such as, but not limited to, ¾", ⅞" or 1" tubing. A typical wheelchair comprises two kick tubes.

The wheelchair 10 has large rear wheels 16. The large rear wheels 16 are positioned laterally outwardly of the frame 11. The wheelchair 10 also comprises small front wheels 17. The large rear wheels 16 comprise pushrims 19 to allow the user of the wheelchair 10 to independently maneuver each large rear wheel 16 to move the wheelchair 10. The frame 12 may further comprise a push cane 20 to give an assistant handles to push the wheelchair 10 from behind. One skilled in the art would recognize that the basic configuration of a wheelchair as shown in FIG. 1 may be configured differently between various manufacturers and models of the various manufacturers. A wheelchair is designed to carry a person's weight. The frame, in any one of the many varied configurations, achieves this purpose. Frame members may be perpendicular to one another or may be angled to one another, depending on configuration of the wheelchair.

An embodiment of the attachment 100 for the wheelchair is shown in FIG. 1 connected to the wheelchair 10. The embodiment of the attachment 100 for a wheelchair shown in FIG. 1 comprises a left wheel attached to a left wheel motor, a right wheel 101 attached to a right wheel motor, and a controller 110 capable of independently controlling the left wheel motor and the right motor. The embodiment of the attachment 10 also comprises an attachment means. In this embodiment, the attachment means is a tube 103 that is capable of being received into kick tube 18. Other attachment means may also be used such as, but not limited to, a tube capable of receiving a kick tube, a clamp, a hinged connection, a threaded connector, a quick disconnect, or combination thereof, for example. The connection may additionally be fixed by a pin, a set screw, a latch, a chain, or other locking means. Embodiments of the invention may comprise two left and right side components, See FIGS. 5-7, or all the components of the attachment may be integrated into a single unit. In the embodiment comprising two left and right side components, each component may be independently connected to a kick tube and electrically connected to the controller 110. In the integrated embodiment of the attachment, the attachment may comprise two attachment means capable of attaching to each kick tube.

In another embodiment of the invention, the attachment comprises tube extending from the back to act as additional kick tubes for attaching other accessories to the attachment such as IV poles.

Embodiments of the invention may comprise at least one sleeve for receiving a kick tube of a wheelchair or may comprise at least one kick tube connector comprises a tube for inserting into a kick tube.

Embodiments of the attachment for the wheelchair may further comprise a suspension system. For example, the attachment may comprise a motor mount and the suspension system is between the kick tube connector and the motor mount. This allows that motor to adjust in height as the wheelchair rolls over uneven terrain and ensures a consistent contact pressure between the drive wheels and the surface to be traversed. Further embodiments may include a suspension system between the wheels and motors.

The attachment means or the frame of the attachment for the wheelchair may also include a hinged assembly. The hinge assembly may be capable of moving the wheels from an in-use position to a stored position. In such an embodiment, the wheelchair may be easily converted from a motorized wheelchair to a non-motorized wheelchair allowing someone to push the wheelchair or the user to roll the wheelchair themselves.

As can be seen in FIG. 1, in the embodiment of the attachment 100 for a wheelchair, the wheels 101 of the attachment 100 are positioned to also act as an anti-tipping device for the wheelchair. The frame 103 of the attachment extends the wheels 101 extend behind the wheels 16 of the wheelchair 10 to reduce the tendency of the wheelchair 10 to tip backwards. As such, the wheelchair provides a safer ride for the user and the user is more confident. Therefore, the user will feel further independence and confidence to travel places that the user did not previously feel comfortable traveling.

The embodiment of the attachment 100 for a wheelchair of FIG. 1 also comprises at least one battery 105. The attachment may comprise one or more batteries to provide sufficient power to move a wheelchair comprising a user. The type, number and size of the batteries for a wheelchair are a significant factor in the range and power of a powered chair. Generally, the larger the chair's batteries, the greater the power and the longer the chair's range will be between charges. Many wheelchairs comprise two rechargeable 12-volt batteries. Most wheelchairs utilize U1, group 22 or 24 batteries, although other batteries are also used. More manufacturers are designing chairs around the group 24 battery because it affords a longer range. The type of battery required is also an important consideration in terms of safety, maintenance, and transport. Powered chairs may utilize lead acid, gel cell, or sealed wet batteries. Gel cell batteries require the least maintenance and have less danger of leaking than do the other battery types. Gel cell batteries are also required by a number of airlines when transporting powered chairs. Factors such as the user's weight, additional powered features, speed, and the type of terrain on which the wheelchair is used may affect the range.

Figure 1A:
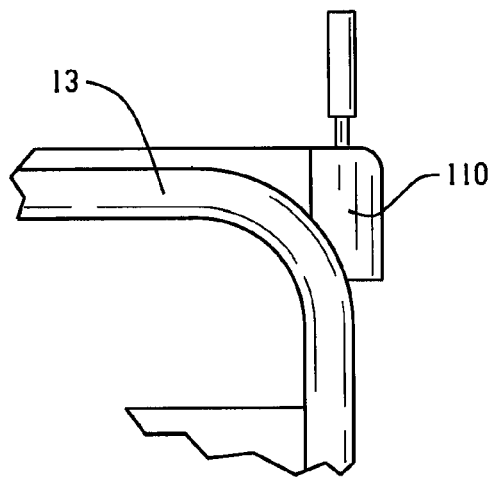
FIG. 1A depicts an arm rest comprising a joy stick for controlling an embodiment of a motorized anti-tipper device attached to a wheelchair.
Figure 1C:
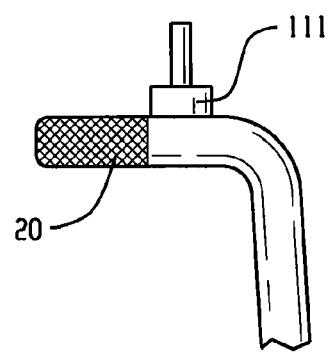
FIG. 1C depicts a push cane comprising a tiller for controlling an embodiment of a motorized anti-tipper device attached to a wheelchair.
Figure 1B:
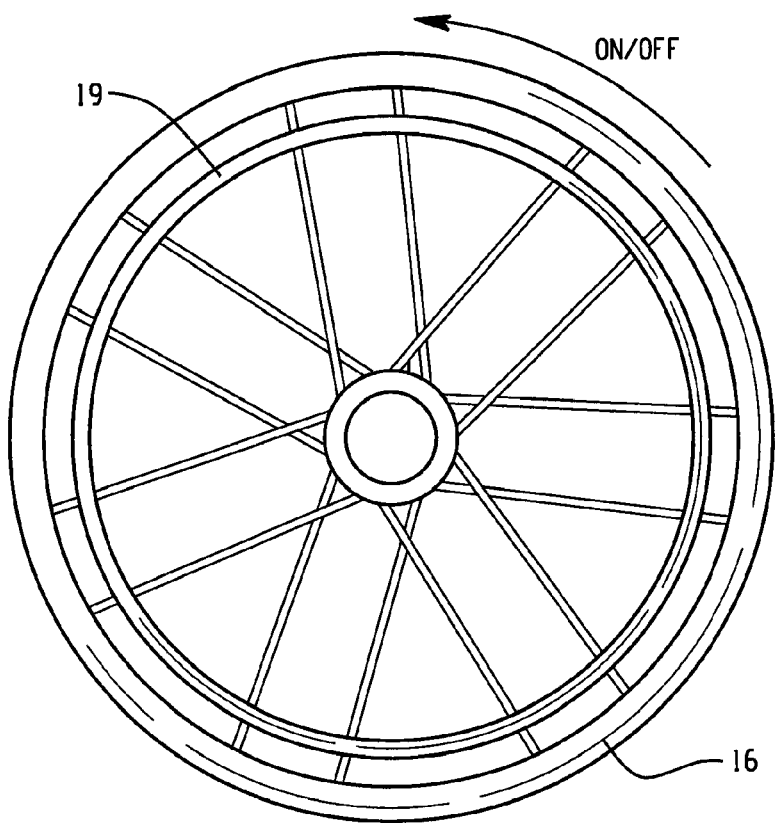
FIG. 1B depicts a rear wheel for controlling an embodiment of a motorized anti-tipper device attached to a wheelchair.
Figure 2:
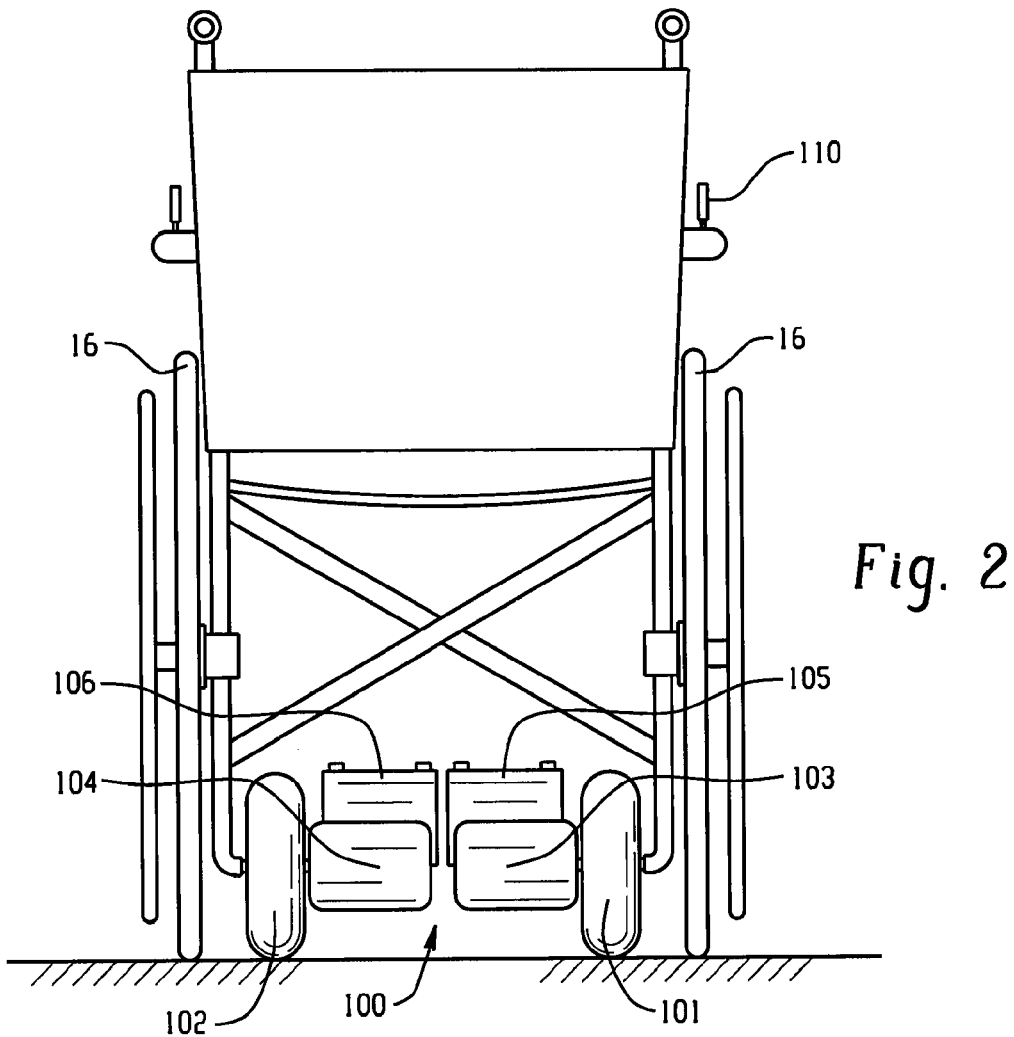
FIG. 2 depicts a rear view of an embodiment of a motorized anti-tipper device attached to a wheelchair.

The embodiment of the attachment 100 is shown in a rearward view in FIG. 2. As can be seen, the embodiment of the attachment 100 for a wheelchair 10 comprises a left wheel 102 attached to a left motor 104, a right wheel 101 attached to a right motor 103. The embodiment of the attachment 100 further comprises a controller 110 capable of independently controlling the left motor 102 and the motor. The controller 110 may be any controller capable of controlling at least one movement including forward, reverse, left turns, right turns and combinations of these movements. Suitable controllers include, but are not limited to, joy sticks, tillers, track balls, push buttons, key boards, touch pads, steering wheels, chin controllers, or combinations thereof. A joy stick controller 110 is shown in FIGS. 1 and 1A. and a tiller controller 111 accessible to an assistant is shown in FIG. 1C. In certain embodiments, the controller should be able to control two motors, preferably two reversible variable speed motors, allow turning including turning in reverse, and braking. Additionally, embodiments of the controller may be a microprocessor based controller. Further, embodiments of the controller may include feedback control loops including actual speed of one or more wheels, either or both of the motors, voltage drop across each motor, speed of the other wheels of the wheelchair, ground speed of the wheelchair, battery voltage, battery temperature, other properties of the battery or motors, for example. The controller may use this information to more safely and efficiently allow the user to use the wheelchair. Further embodiments of the attachment 110 may convert a non-motorized wheelchair into a pushrim activated power assist wheelchair. A pushrim activated power assist wheelchair allows the user to control the wheelchair and the drive motors with the pushrims on the wheels of the wheelchair. In embodiments of the pushrim activated power assist wheelchair, a motor or motors of the accessory may be activated by pulling back on the pushrims and, while the wheelchair is in operation, the motors may be deactivated by also pulling back on the pushrims, as shown in FIG. 1B. Other methods for activating and deactivating the motors may also be used. The attachment comprises sufficient controls to determine the speed and direction that the user wishes to proceed and maintain that speed and direction. Embodiments of the attachment would include the controllers necessary to receive input from the movement of the wheels by the user and convert that to outputs to maintain the desired speed and direction.

The motors of the wheelchair may be any motor capable of moving a wheelchair and a user. Embodiments of the attachment may comprise one or two motors. For embodiments of the attachment for the wheelchair comprise two motors, the motors may be operated at different speeds or directions to turn the wheelchair. In a specific embodiment, the left motor is a variable speed reversible motor and the right motor is also variable speed reversible motor and the controller independently controls the direction and speed of the left motor and the right motor.

Figure 3:
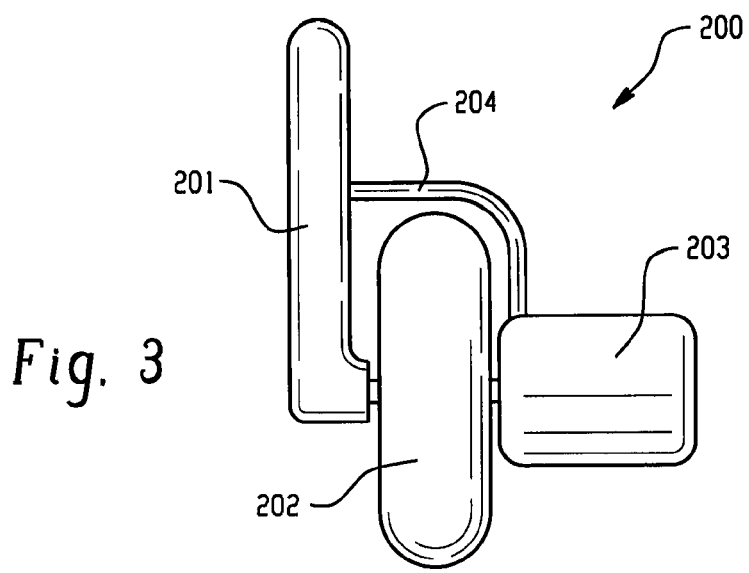
FIG. 3 depicts a portion of an embodiment of a motorized anti-tipper device.
Figure 4:
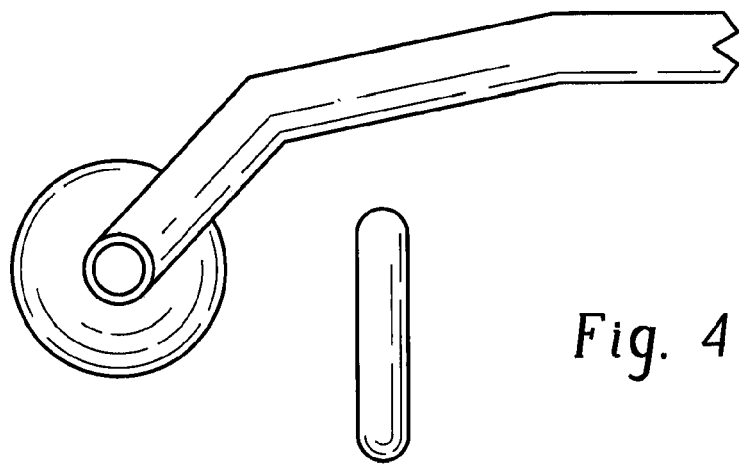
FIG. 4 depicts an anti-tipper wheel.

FIG. 3 shows a portion of an attachment 200 for a wheelchair. The attachment 200 comprises attachment means 201, a drive wheel 202, a motor 203 for powering the drive wheel, and conduit for holding the electrical wires that provide electrical communication to the controller. Two such embodiments may be used to power both the left side and the right side of the wheelchair. Alternatively, one such attachment may be used to assist a wheelchair user that may only operate one wheel of the wheelchair.

Figure 5:
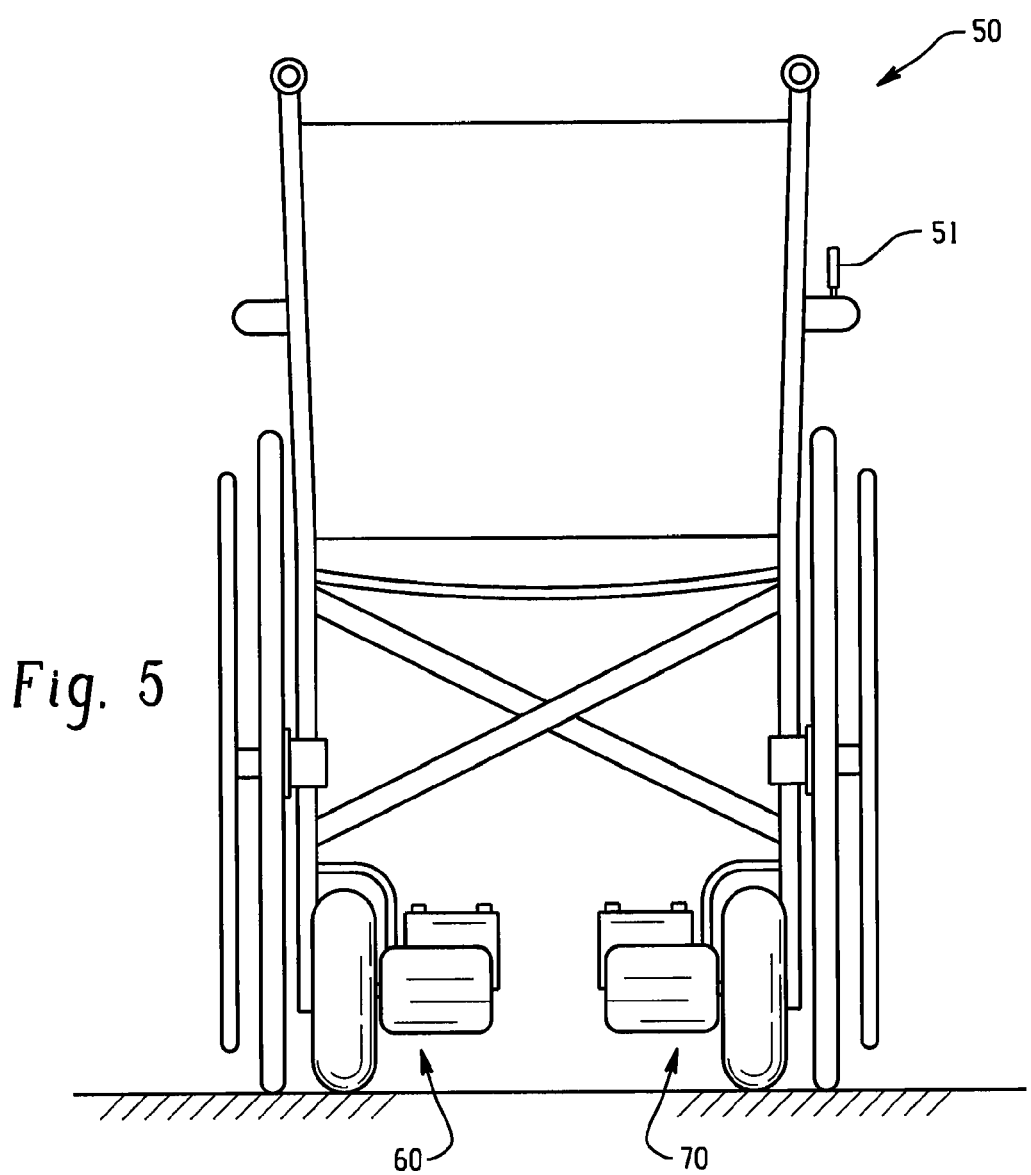
FIG. 5 depicts a rear view of an embodiment of a motorized anti-tipper device attached to a wheelchair.
Figure 7:
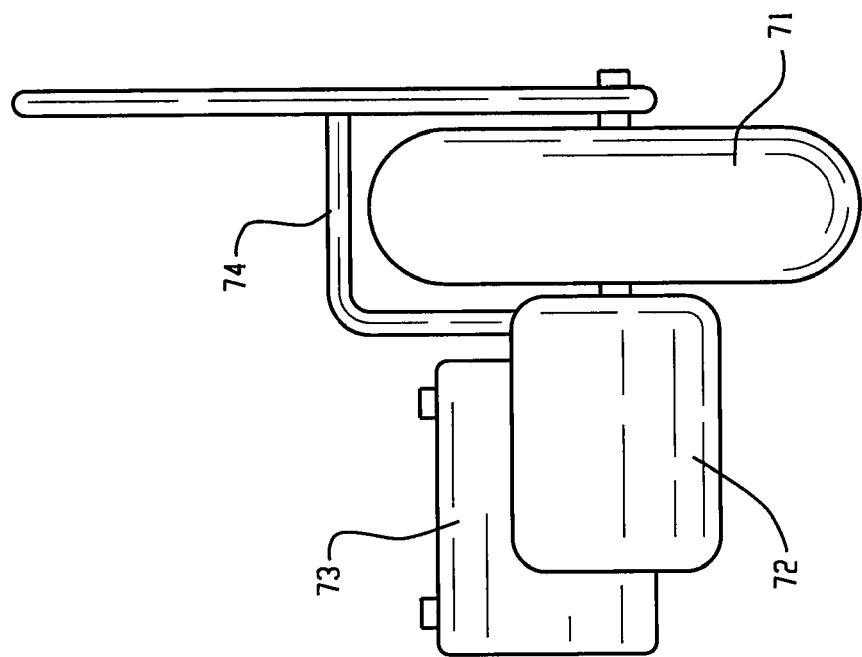
FIG. 7 depicts a right side portion of an embodiment of a motorized anti-tipper device.
Figure 6:
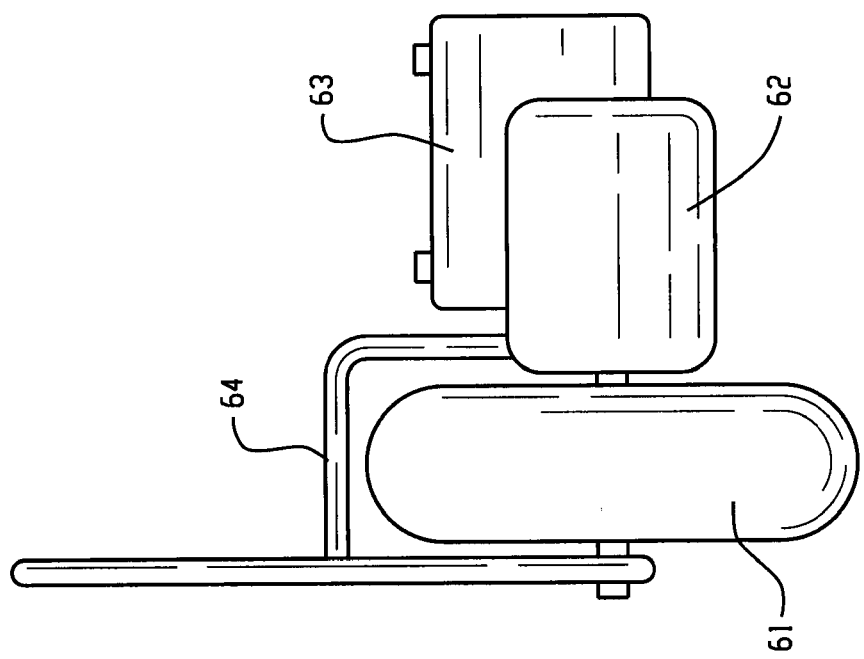
FIG. 6 depicts a left side portion of an embodiment of a motorized anti-tipper device.

FIG. 5 shows wheelchair 50 comprising two separate attachments, a left side attachment 60 (FIG. 6) and a right side attachment 70 (FIG. 7). Either one of the attachments may be removed to provide assistance to the user on only one side of the wheelchair as desired. In this embodiment of FIG. 7, each attachment comprises a drive wheel 61 or 71, a motor 62 or 72, a battery 63 or 73, and a support frame 64 or 74. However, as in other embodiments, both of the attachments may be controlled by a single controller 51. Additionally, as in other embodiments, the attachments may both be powered by a single battery.

Although the invention has been described using various embodiments, components, described independently or in combination with other components, of the various embodiments may be combined and are still contemplated by the inventors to be embodiments of the invention.

The invention claimed is:

1. An attachment to reversibly convert a nonmotorized wheelchair to a motorized wheelchair, wherein the wheelchair has two kick tubes and two rear wheels, comprising:
   a frame;
   a battery;
   two sleeves connected to the frame, wherein both sleeves are capable of receiving the kick tubes of the wheelchair;
   a left wheel attached to a left wheel motor, wherein the left wheel and the left wheel motor are connected to the frame;
   a right wheel attached to a right wheel motor, wherein the right wheel and the right wheel motor are connected to the frame; and
   a controller capable of independently controlling the left wheel motor and the right motor, wherein the frame of the attachment extends the left wheel and the right wheel behind the rear wheels of the wheelchair to reduce the tendency of the wheelchair to tip backwards.

2. The attachment of claim 1, wherein the left wheel motor and the right wheel motor are reversible variable speed motors.

3. The attachment of claim 2, wherein the controller is in electrical communication with the left wheel motor and the right wheel motor.

4. The attachment of claim 1, comprising a suspension system.

5. The attachment of claim 4, wherein the attachment comprises a motor mount and the suspension system is between the kick tube connector and the motor mount.

6. The attachment of claim 4, wherein the suspension system is between the wheels and motors.

7. The attachment of claim 1, further comprising a hinge assembly.

8. The attachment of claim 7, wherein the frame comprises the hinge assembly.

9. The attachment of claim 8, wherein the hinge assembly is capable of moving the wheels from an in-use position to a stored position.

10. The attachment of any of the preceding claims, wherein the attachment is releasably connected to two kick tubes of the wheelchair.

11. The attachment of claim 1, wherein the left wheel and the right wheel are positioned to act as an anti-tipping device for the wheelchair.

* * * * *